United States Patent [19]

Doll

[11] Patent Number: 5,727,591

[45] Date of Patent: Mar. 17, 1998

[54] ELECTROMAGNETIC ROTARY INDEXING VALVE

[75] Inventor: Robert A. Doll, Glendale, Wis.

[73] Assignee: Applied Power Inc., Butler, Wis.

[21] Appl. No.: 569,040

[22] Filed: Dec. 7, 1995

[51] Int. Cl.$^6$ .............................. F16K 37/00; F16K 31/06
[52] U.S. Cl. .................. 137/554; 251/129.2; 251/207; 251/230
[58] Field of Search ..................... 137/554; 251/129.2, 251/207, 230

[56] References Cited

U.S. PATENT DOCUMENTS

| | | | |
|---|---|---|---|
| 320,105 | 6/1885 | White | 251/129.2 X |
| 1,644,171 | 10/1927 | Caldwell | 251/230 X |
| 1,673,451 | 6/1928 | Hartfield et al. | 251/230 X |
| 1,765,377 | 6/1930 | Marks | 251/129.2 |
| 1,856,350 | 5/1932 | Metcalf | 251/230 X |
| 3,173,646 | 3/1965 | Wilcox | 251/129.2 |
| 4,744,285 | 5/1988 | Presley | 91/513 |
| 5,573,224 | 11/1996 | Kim | 251/230 X |
| 5,599,003 | 2/1997 | Seemann et al. | 251/129.2 X |

*Primary Examiner*—John Rivell
*Attorney, Agent, or Firm*—Quarles & Brady

[57] ABSTRACT

A rotary indexing valve has an electromagnetic coil which shuttles a spool axially. As the spool shuttles axially, it cams on axially opposed surfaces so as to rotatably index the spool. Such rotatable indexing of the spool angularly positions different sized orifices into or out of registration with one of the ports in the housing to change the cross sectional area of the flow passage between the inlet and outlet ports of the housing. One of the cam surfaces is defined by an alternating series of peaks and valleys, and the valleys are at different heights so as to change the spacing between the spool and a pole piece, which varies the inductance of the coil dependent on the angular position of the spool. The inductance of the coil can therefore be measured to provide an electrical signal indicative of the angular position of the spool.

8 Claims, 2 Drawing Sheets

ELECTROMAGNETIC ROTARY INDEXING VALVE

FIELD OF THE INVENTION

The invention relates to electromagnetic valves, and in particular to such a valve which has an angularly indexable spool.

BACKGROUND OF THE INVENTION

Rotary valves are well known. A common example is the ordinary household water faucet. Such valves may be used to control all types of fluids, including water, hydraulic fluid, fuels, air and other gases.

Electrically driven rotary valves are also known. For example, a stepper motor may be used to precisely vary the angular position of the valve. However, stepper motors are expensive, relatively large, and require complex circuitry to drive the motor and control its position.

Electromagnetic coil, or solenoid, type valves are also well known. Typically, the coil is energized with a proportional voltage, pulse width modulated or simple pulse electrical signal to move a poppet or spool, or an armature which in turn moves a poppet or spool, axially so as to change the state of the valve. Such valves are very useful in many applications, but typically have only two discrete positions, although between those positions the valve may be variable in the case of a proportional voltage controlled valve. However, in applications where it is necessary to precisely meter several different flows, typically several of the prior art solenoid valves were necessary, so as to fix the orifice size which restricted the flow to the desired magnitude. In addition, in these valves, the electrical coil signal had to be maintained continuously to maintain a certain valve opening between the two extreme positions.

SUMMARY OF THE INVENTION

The invention provides a rotary valve having a valve spool axially slidable and rotatable in a main bore of a housing and an electromagnetic coil for shuttling the spool axially in the main bore. At least one orifice is formed in the spool to be in registration with a port of the housing in at least one angular position of the spool relative to the housing. Converter members are provided on the spool and on the housing for engaging one another and converting the axial motion of the spool imparted by the coil into rotary motion of the spool relative to the housing. The orifice may be rotatably indexed into or out of registration with the one port by pulsing the electromagnetic coil with an electrical signal, thereby precisely varying the flow area through the valve. In addition, since the change in flow area may be achieved with a single electrical pulse to the coil, the electrical signal need not be continuously applied to the coil to maintain the state of the valve.

In a preferred form, the converter members include cam elements for camming the spool rotatably relative to the housing as the spool is moved axially relative to the housing. The cam elements may include a pair of spaced-apart axially facing annular cam surfaces on the housing and a pin extending radially through the spool with its ends camming on the cam surfaces. Thereby, a readily producible axial to rotary motion converter mechanism is provided.

In another useful aspect, at least one of the cam surfaces, preferably the one which locates the spool in the at-rest position of the spool, is defined by an alternating series of peaks and valleys, and at least two of the valleys are at different heights. This varies the axial spacing between the spool and a pole piece of the housing, which varies the magnetic reluctance of the flux path which runs through the coil, housing, air space and spool. This changes the inductance of the coil, which can be electrically measured via the coil leads, and can be used to provide an electrical indication of the angular position of the spool, and therefore the state of the valve.

Another advantage of a valve of the invention is that it may be bi-directional in flow direction. In addition, more than one set of ports and corresponding orifices or blocking portions may be provided so that several hydraulic devices may be semi-independently controlled, so that the valve may be used, for example, in sequencing control of several different hydraulic devices.

Other objects and advantages of the invention will be apparent from the following detailed description and from the drawings.

DETAILED DESCRIPTION OF THE PREFERRED EMBODIMENTS

Figure 1:
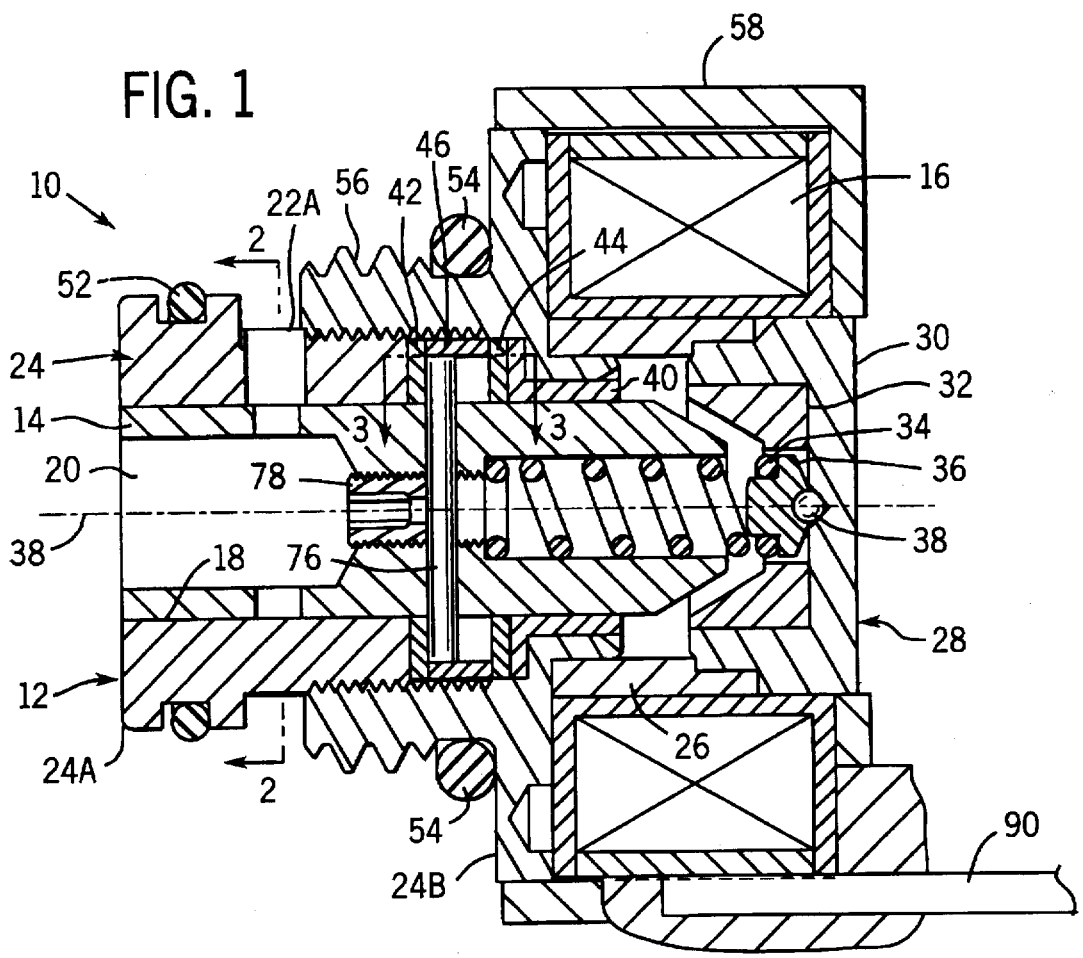
FIG. 1 is a cross sectional view of a valve incorporating the invention as viewed from the plane of the line 1—1 of FIG. 2.

FIG. 1 illustrates a valve 10 of the invention, which includes a housing 12, a generally cylindrical rotary spool 14 and a coil 16. The housing 12 is preferably made of steel and defines a main bore 18 in which the rotary spool 14 may slide axially and rotate relative to the housing 12, a first bi-directional port 20 at the leftward end of the main bore 18 (as viewed in FIG. 1), and a set of three second bi-directional ports 22A, 22B and 22C. In other words, the port 20 may serve as an inlet port, with the ports 22A–C serving as an outlet port, or the ports 22A–C may serve as the inlet, with the port 20 serving as the outlet.

The housing 12 includes a steel body 24, itself made up of a lower body 24A and an upper body 24B, a non-magnetic stainless steel sleeve 26 which is brazed to the body 24, and a steel pole piece 28, which includes a cap 30 and a cup 32, which are held together by any suitable means, such as a press fit. A spring 34 biases the spool 14 away from pole piece 28. Spring retainer 36 and ball 38 permit rotation of the spring 34 relative to the housing 12 about axis 38.

The housing 12 also includes a bushing 40 in which the spool 14 is journaled so as to be axially slidable and angularly rotatable about the spool axis 38. Converter elements in the form of a pair of annular cam rings 42 and 44 separated by a spacer ring 46 are captured against the bushing 40 by the lower body 24A, which is threaded into and secured by the upper body 24B. An o-ring 52 seals the port 20 from the ports 22A–C, and an o-ring 54 seals the bore in which valve 10 is screwed (not shown) by screw threads 56.

The coil 16 is slipped over the rightward end of the housing 12 and secured thereto by cover 58, which is secured to the housing 12 by any suitable means, for example by a crimp, press fit, snap ring, etc.

Figure 2:
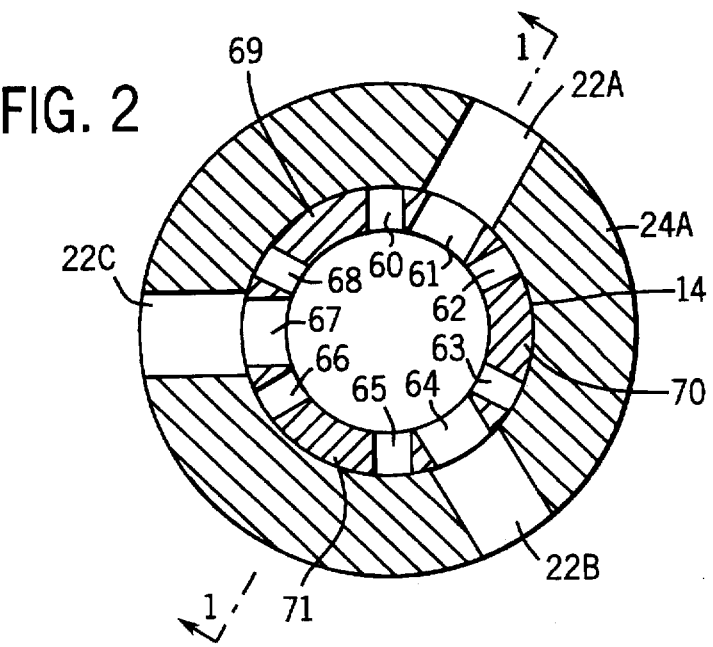
FIG. 2 is a cross sectional view of the valve as viewed from the plane of the line 2—2 of FIG. 1.

Referring also to FIG. 2, a series of orifices 60, 61, 62, 63, 64, 65, 66, 67 and 68 are formed in the spool 14. All of these orifices have their axes in generally the same radial plane, which is generally the same as the radial plane of the axes of the ports 22A-C when the spool 14 is in the axial position shown in FIG. 1. Also in this radial plane, solid or blocking sections 69, 70 and 71 are provided. However, slight differences in the planes of the sets of ports may be provided, as further described below.

The orifices 61, 64 and 67 are all of the same diameter, and the orifices 60, 62, 63, 65, 66 and 68 are all of the same diameter. As shown in FIG. 2, when one of the three orifices 61, 64 and 67 is aligned with one of the ports 22A, 22B, or 22C, the other two orifices are also aligned with the other two respective ports. Similarly, the orifices 60, 63 and 66 are associated with one another, and the orifices 62, 65 and 68 are associated with one another.

Preferably, the ports 22A-C are 120° apart, and the associated orifices of each set are 120° apart, i.e., one set being the orifices 61, 64 and 67, another set being the orifices 60, 63 and 66, and the third set being the orifices 62, 65 and 68. Also, the solid areas 69, 70 and 71 are spaced 120° apart, such that when one of the solid areas is aligned with one of the ports 22A-C, the other two solid areas are also aligned with the ports 22A-C. Of course, this need not necessarily be the case in all applications, since the flow rates and number of orifice positions could vary.

Since the orifices 61, 64 and 67 are the largest of all the ports, when they are aligned with the ports 22A-C as shown in FIG. 2, the valve 10 is fully open. If the spool 14 were turned so as to align the orifices 62, 65 and 68 with the ports 22A-C, the cross sectional area of the flow path between the ports 20 and 22A-C would be somewhat reduced. Turning the spool still further, to align the solid sections 70, 71 and 69 with the respective ports 22A, 22B and 22C, closes off communication between the ports 20 and 22A-C.

Another turn of the spool 14 (counter-clockwise as viewed in FIG. 2), would place the orifices 63, 66 and 60 in communication with the respective ports 22A, 22B and 22C, thereby returning to the cross sectional area for the flow path between the ports 20 and 22A-C as was the case when the orifices 62, 65, and 68 were in registration with the ports 22A, 22B and 22C.

Thus, the valve 10 can be used, for example, in the hydraulic circuit of an automotive shock absorber, to control the flow rate from one of the shock absorber hydraulic chambers to another as the fluid is pumped between them when the shock absorber piston reciprocates, and therefore control the stiffness of the automobile's suspension system. The valve 10 position shown in FIG. 2 would provide the highest flow rate, and therefore a "soft" ride. The position on either side of the position shown in FIG. 2, either when the orifices 60, 63 and 66 were aligned with the ports 22A-C or when the orifices 62, 65 and 68 were aligned with the ports 22A-C, would provide a medium flow rate, for a medium ride. When the ports 22A-C were blocked by the solid portions 69, 70 and 71, no flow would be provided, except for leakage, to provide a "hard" ride.

The various sets of orifices or solid portions are indexed into registration with the ports 22A-C by converter elements including pin 76, which extends through and beyond a cross-bore in the spool 14, and including the cam rings 42 and 44. The pin 76 is secured in the spool 14 by a set screw 78, but could be secured by any other suitable means, such as a stake or press fit. The ends of the pin 76 extend beyond the outer diameter of the spool 14 and engage cam surface 42A of cam ring 42 when the coil 16 is not energized, under the bias of spring 34.

The cam face 42a is defined by an alternating series of peaks 84–86 and valleys 81–83, which continue all the way around the face 42a for 360° and the opposed axially facing cam face 44A is also defined by an alternating series of peaks 91–93 and valleys 87–90, which continue all the way around the face 44a for 360° The peaks and valleys of the face 42a are approximately 180° out of phase from the peaks and valleys of the face 44a, such that the peaks of cam face 42a are at an angular position which is approximately midway between the valleys and the peaks of the cam face 44a.

As such, when coil 16 is energized, thereby pulling spool 14 rightwardly as viewed in FIG. 1, pin 76 is moved in the direction indicated by arrow 1 into engagement with face 44a. The ends of pin 76, after engaging face 44a, cam on face 44a in the direction indicated by arrow 2 down into the adjacent valley 88. Then, when coil 16 is deenergized, spool 14 is moved leftwardly under the bias of spring 34, thereby moving the ends of pin 76 back into engagement with face 42a, in the direction indicated by arrow 3. Thereafter, the ends of pin 76 cam on face 42a in the direction indicated by arrow 4 down into the next adjacent valley 81 of face 42a.

This movement can be accomplished with a single pulse electrical signal to the coil 16, sufficient in voltage and duration to move the pin 76 against the surface 44a so as to cam it past the adjacent peak 85 on surface 42a and past the next adjacent peak 91 on the surface 44A to be ready for the next pulse. Thereby, the axial movement of the spool 14 imparted by the coil 16 and spring 34 is converted to rotary motion of the spool 14 relative to the housing 12 so as to index one of the sets of orifices or solid portions into or out of registration with the ports 22A-C.

The valleys on the face 42a angularly position the pin 76 precisely so as to place one of the sets of orifices or the set of solid portions into angular and axial registration with the ports 22A-C. Since each valley on the face 42a corresponds to a certain angular position of the spool 14, the valleys on the face 42a may be made at different heights (relative to the pole piece 28), so as to change the axial spacing between the spool 14 and the pole piece 28.

Figure 3:
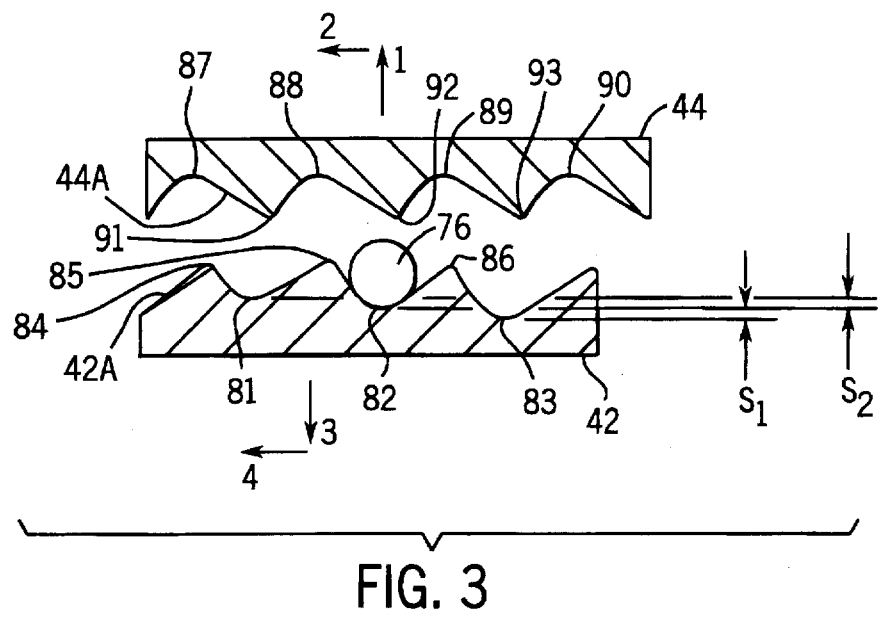
FIG. 3 is a partial cross sectional view of cam rings and a pin for the valve as viewed from the plane of the line 3—3 of FIG. 1.
Figure 4:
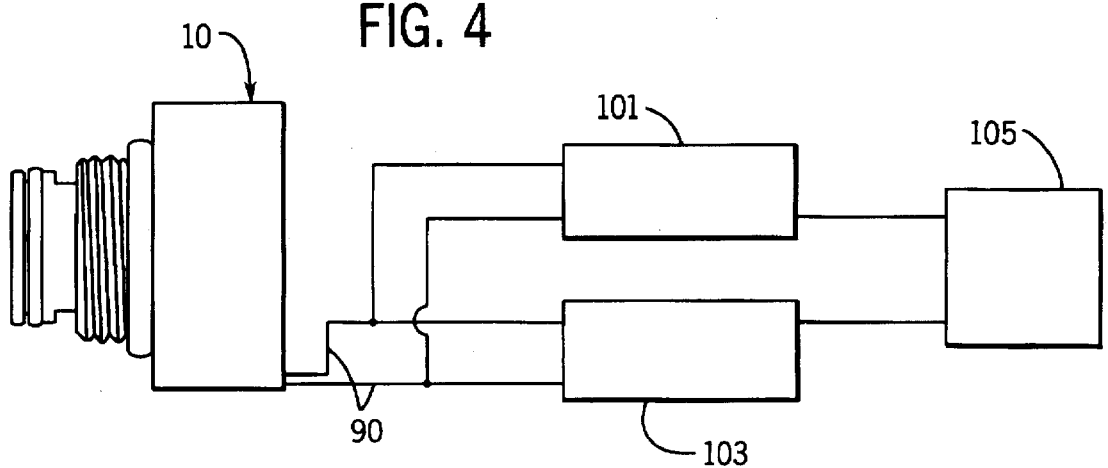
FIG. 4 is a schematic view of a circuit for operating the valve 10.

These differences in height are indicated by the arrows $S_1$ and $S_2$ in FIG. 3 and are desirable because the inductance of the coil 16, which can be electrically detected by well known methods, is dependent on the axial spacing between the spool 14 and the pole piece 28. Thereby, the inductance of the coil 16 as measured externally by any suitable electronic circuit 101 attached to the leads 90 (which are primarily used for energizing the coil 16 with valve driver 103) can be used to provide an indication of the angular position of the spool 14. This can advantageously be used for feedback to an electrical controller 105, or as a memory device for recalling the angular position of the spool 14, and therefore its setting. Of course, the inductance sensing circuit 101 could be incorporated into the valve driver 103, or all the circuits 101, 103 and 105 could be incorporated into a single controller.

Alternatively, another method of position monitoring could be to have all but one valley at the same height. The one valley at the different height could be used as a reference or "home" position, and the position of the valve determined by counting the number of times the valve has been indexed from the home position.

If the valleys are made at different heights, as described above, then it may be desirable to make the sets of orifices so that the axes of each set are coplanar with the axes of the ports 22A–C when the set is angularly aligned with the ports 22A–C. This Would result in the planes of the axes of the various sets differing slightly from one another, according to how much the heights of the corresponding valleys differ from one another.

In the embodiment described, the valve has three different states, i.e., hard, medium and soft, provided by four sets of orifices or solid portions (since two of the sets of orifices each provide a "medium" state). However, the spool has many more discrete angular positions, which are determined by the number of valleys on the cam face 42A. For example, the embodiment illustrated would have 12 valleys and therefore 12 discrete angular positions. It could, therefore, have as many as 12 different sized orifices to yield as many as 12 different states.

Also, a valve of the invention could have more than one set of inlet/outlet ports similar to the ports 22A–C. For example, another set of such ports could be provided at an axial location spaced from the ports 22A–C, with sets of orifices and solid portions provided in the spool at that location to be selectively rotated into registration with the ports. The spool could be made longer and many such sets of ports and registrable orifices/solid portions provided over the length of the spool. Thus, many different devices could be controlled by a single valve, by communicating them with different sets of ports. This could be advantageously applied, for example, in sequencing control, in which several different hydraulic devices are each controlled together in a certain sequence.

Many modifications and variations to the preferred embodiment described will be apparent to those skilled in the art which will still incorporate the invention For example, the opposed annular cam faces 42a and 44a could be provided on the spool 14, to engage cam structures provided on the housing. Also, as used herein, the word "cam" refers to not only sliding motion of two surfaces relative to one another, but also rolling motion, i.e., rollers could be provided on the ends of the pin 76 to roll on the respective cam surfaces 42a and 44a, with the same effect as the embodiment illustrated.

In addition, the spring 34 could be eliminated and other means, such as reversing the polarity of the coil 16 or a hydraulic pressure, may be used to return the spool 14 to its at-rest or normal position. Further, the coil need not act directly on the spool, but it could act on an armature which in turn moved the spool axially. Thus, the invention should not be limited to the preferred embodiments described and illustrated, but should be defined by the claims which follow.

I claim:

1. In a solenoid operated valve of the type having a housing with a first port, a second port and a main bore, a valve spool in said main bore, said spool being axially slidable and rotatable relative to said housing, an electromagnetic coil for shuttling said spool axially in said main bore relative to said housing, at least one orifice formed in said spool to be in registration with one of said ports in at least one angular position of said spool relative to said housing and converter members on said spool and on said housing for engaging one another and converting said axial motion of said spool imparted by said coil into rotary motion of said spool relative to said housing, the improvement wherein said orifice is rotatably indexed into or out of angular registration with said one port by pulsing said electromagnetic coil with an electrical signal.

2. The improvement as claimed in claim 1, wherein at least two orifices of different sizes are formed in said spool, said orifices being at different angular positions and in generally the same radial plane, and each said orifice being angularly registrable with said one port by pulsing said coil.

3. The improvement as claimed in claim 1, wherein said spool is indexable into or out of at least two different angular positions relative to said housing, said two positions differing in axial position relative to said housing so as to vary the inductance of said coil between said two positions.

4. In a solenoid operated valve of the type having a housing with a first port, a second port and a main bore, a valve spool in said main bore, said spool being axially slidable and rotatable relative to said housing, an electromagnetic coil for shuttling said spool axially in said main bore relative to said housing, at least one orifice formed in said spool to be in registration with one of said ports in at least one angular position of said spool relative to said housing and cam members including a pair of spaced apart axially facing annular cam surfaces, said cam members camming on one another to cam said spool rotatably relative to said housing as said spool is moved axially relative to said housing, the improvement wherein said orifice is rotatably indexed into or out of registration with said one port by electrically energizing said electromagnetic coil.

5. The improvement as claimed in claim 4, wherein said cam elements also include a pin.

6. The improvement as claimed in claim 5, wherein said pin extends radially through said spool and an end of said pin cams on said cam surfaces.

7. The improvement as claimed in claim 6, wherein said cam surfaces are formed on cam rings which are secured to the housing.

8. The improvement as claimed in claim 4, wherein an electrical circuit is connected to said coil for detecting the inductance of said coil to yield an indication of the position of said spool relative to said coil.

* * * * *